United States Patent Office 3,370,032
Patented Feb. 20, 1968

3,370,032
VINYL CHLORIDE POLYMER COMPOSITION PLASTICIZED WITH MIXED BENZOIC/ALKANOIC ACID ESTERS
George H. Potter, St. Albans, W. Va., assignor to Union Carbide Corporation, a corporation of New York
No Drawing. Filed Sept. 6, 1963, Ser. No. 307,017
5 Claims. (Cl. 260—31.6)

The invention relates to novel plasticized vinyl chloride polymer compositions. In a particular aspect, the invention relates to mixed benzoic and alkanoic esters used as plasticizers for vinyl chloride polymers.

In U.S. Patent No. 3,000,747 it is disclosed that the dialkanoic esters of 2-hydroxymethyl-2-methylpropyl 2-hydroxymethyl-2-methylpropionate can be used as plasticizers for vinyl chloride polymers. However, the said dialkanoic esters have limited utility caused by relatively low solvating power for vinyl chloride polymers which results in a high minimum flux temperature (i.e., the minimum temperature at which a polymer/plasticizer mixture must be heated in order to cause the polymer and plasticizer to form a homogeneous material). Since vinyl chloride polymers readily decompose when heated, it is advantageous to employ a plasticizer that will form a homogeneous mixture with the vinyl chloride polymer at a relatively low temperature.

In accordance with the present invention, it has been discovered that mixed alkanoic/benzoic esters of 2-hydroxymethyl - 2 - methylpropyl 2 - hydroxymethyl - 2-methylpropionate have enhanced utility as plasticizers for vinyl chloride polymers in view of the fact that an admixture of said mixed esters plus vinyl chloride polymer has a significantly lower minimum flux temperature than when the dialkanoic esters are used. Therefore, the present invention provides novel plasticized compositions which comprise vinyl chloride polymer and a plasticizing amount of mixed alkanoic/benzoic ester of 2-hydroxymethyl - 2 - methylpropyl 2 - hydroxymethyl - 2 - methylpropionate.

The vinyl chloride polymers that are employed in the present invention are homopolymers of vinyl chloride and copolymers of vinyl chloride and one or more ethylenically unsaturated monomers that are copolymerizable therewith. Examples of other useful comonomers include vinyl acetate, maleic anhydride, vinylidene chloride, acrylonitrile, vinyl alcohol, acrylic and methacrylic acid and esters, styrene, and the like. The most useful vinyl chloride polymers contain at least 50 weight percent of polymerized vinyl chloride. The vinyl chloride polymers preferably have molecular weights such that the polymers have an inherent viscosity in the range of from 0.2 to 1.6, measured by ASTM Method D–1243, Method A.

The mixed alkanoic/benzoic esters employed in the invention are produced by reacting a mixture of one or more alkanoic acids and benzoic acid with 2-hydroxymethyl - 2 - methylpropyl 2 - hydroxymethyl - 2 - methylpropionate under esterification conditions. The alkanoic acids that can be employed are those which have from 6 to 18 carbon atoms, and preferably, from 8 to 10 carbon atoms, inclusive. Illustrative alkanoic acids include caproic and other hexanoic acids, heptanoic acid, caprylic acid, 2-ethylhexanoic acid, isooctanoic acids derived from heptenes by the "OXO" process, nonanoic acid, n-decanoic acid, isodecanoic acid derived from nonenes by the "OXO" process, undecanoic acid, lauric and other dodecanoic acids, tridecanoic acid, myristic and other tetradecanoic acids, pentadecanoic acid, palmitic acid, margaric acid, stearic acid, and the like. The various octanoic, nonanoic, and decanoic acids are especially preferred.

The alkanoic and benzoic acids are employed in a molar ratio in the range of from 70:30 to 30:70, and preferably from 60:40 to 40:60.

In the production of the mixed esters employed as plasticizers in the invention, a mixture of alkanoic and benzoic acids are reacted with 2-hydroxymethyl-2-methylpropyl 2-hydroxymethyl-2-methylpropionate (for brevity, referred to hereinafter as "ester-diol") under esterification conditions. The reactants are preferably employed in a molar ratio of from about 2 to 2.3 moles of acid (i.e., benzoic plus alkanoic acid) per mole of ester-diol. The esterification reaction temperature can vary widely, for instance, from 100° C. to 250° C., and preferably from 150° C. to 200° C. Inert diluents can be used if desired, for instance, benzene, toluene, heptane, hexane, carbon tetrachloride, chlorobenzene, and the like. The concentration of reactants in diluent can vary widely, for instance, from 10 weight percent to 90 weight percent or more, based on weight of reaction mixture. It is desirable to employ as a diluent a material that forms an azeotrope with water in order to continuously remove the water that forms during the esterification reaction. It is also desirable to employ a catalytic quantity of an esterification catalyst, for example, sulfuric acid, hydrochloric acid, phosphoric acid, benzene sulfonic acid, toluene sulfonic acid, aluminum trichloride, stannic chloride, tetraalkyl orthotitanates, and the like. The esterification reaction time can vary over a wide range, for example, from 1 hour to 30 hours. After the esterification, the mixed ester product can be recovered by distilling the reaction mixture under reduced pressure to remove unreacted starting material and inert diluent. If desired, the mixed ester product can be further refined by treatment with activated charcoal, magnesia, diatomaceous earth, and the like.

The plasticized compositions of the invention are prepared by conventional methods. For example, an admixture of powdered vinyl chloride polymer and mixed ester plasticizer can be heated to a temperature sufficient to cause the materials to flux and form a homogeneous mixture.

The mixed ester plasticizer is employed in plasticizing amounts, for example, broadly from about 10 to 100 parts and preferably from about 30 parts by weight to about 70 parts by weight, per hundred parts by weight of vinyl chloride polymer.

Other materials can be employed in the plasticizer/polymer mixture, for instance, stabilizers for the vinyl chloride polymer, fillers, pigments, and the like, the nature and proportions of which will be apparent to those having ordinary skill in the art.

The plasticized compositions of the invention are useful for many applications, for example, in the production of films, sheeting, molded and shaped articles, and the like.

The following examples illustrate various aspects of the invention:

EXAMPLE 1

*Mixed benzoic/n-nonanoic ester of 2-hydroxymethyl-2-methylpropyl 2-hydroxymethyl-2-methylpropionate*

A mixing of 734 grams (3.6 moles) of 2-hydroxymethyl-2-methylpropyl 2-hydroxymethyl-2 - methylpropionate, 569 (3.6) moles grams of n-nonanoic acid, 461 grams (3.78 moles) of benzoic acid, 100 grams of benzene, and 1.8 grams of tetraisopropyl titanate was charged to a 3-liter glass reaction flask. The flask was fitted with a 30 x 200 millimeter electrically heated column packed with 8 by 10 millimeter glass rings, and a condensing stillhead that was equipped with a water trap for removing water of reaction and was connected to a glass bulb receiver. The flask was electrically heated and fitted with a glass ebullator. The reaction mixture was heated at 175° C. to 190° C. at atmospheric pressure utilizing nitrogen sparging to agitate the mixture and provide an inert atmosphere. Water of reaction was continuously removed from the heterogeneous condensate of benzene-water azeotrope collected in the water trap. After 16.5 hours, the residual acidity was 0.25 milliequivalent per gram of no further water of reaction was obtained.

The reaction mixture, which weighed 1600 grams, was stirred with 400 milliliters of 4 percent aqueous sodium hydroxide for thirty minutes at 80° C. to 90° C., and then was washed three times with water.

A total of 211 grams of low boiling material consisting primarily of water, benzene, and a small amount of n-nonanoic acid was removed by vacuum distillation to a maximum temperature of 235° C. at 0.2 millimeter of mercury absolute pressure.

ture had previously been adjusted so that the hot end was about 150° C. and the cool end about 50° C. The temperature gradient bar was fabricated from mild steel and had the following dimensions: 1-inch thick, 4-inches wide, and 18-inches long. One end was supported on a hot plate fitted with a thermostatic temperature control, and the other supported by any convenient method, preferably an unheated metallic surface which will act as a heat sink. The plastisol strip was allowed to remain on the bar for exactly 20 minutes and stripped off from the hot end pulling at an angle of about 90° C. with the bar to the point of breaking. The temperature at this point, measured with a contact pyrometer, was recorded as the minimum flux temperature. Below this point the temperature is too low for adequate fluxing of the plasticizer with the resin to form a continuous strip.

The results of the several evaluation tests are tabulated in Table I, below.

TABLE I
[Evaluation of ester plasticizers]

| | Example | | | |
|---|---|---|---|---|
| | 1 | 2 | 3 | 4 |
| Acid Components | n-Nonanoic/ Benzoic | Isodecanoic/ Benzoic | Isooctanoic/ Benzoic | Isodecanoic |
| Durometer A | 76 | 81 | 77 | 84 |
| Extraction:* | | | | |
| Oil K | 1.7 | 1.0 | 1.2 | 4.0 |
| Water, Percent | 1 | 1.4 | 1 | 1.6 |
| SPI Volatility, Percent | 0.4 | 1.2 | 1.5 | 1.4 |
| Minimum Fluxing Temperature, °C | 111 | 121 | 110 | 150 |

*As determined using 20-mil plaques.

The residue product was further refined by stirring for 30 minutes at 80° C. to 90° C. with a mixture of 1 percent by weight of activated charcoal, 1 percent calcined magnesia, and 2 percent diatomaceous earth, followed by filtering. The final product weighed 112 grams.

EXAMPLES 2–4

In a manner analogous to that described in Example 1, the following esters of 2-hydroxymethyl-2-methylpropyl 2-hydroxymethyl-2-methylpropionate were prepared:

| | Example No. | | |
|---|---|---|---|
| | 2 | 3 | 4 |
| Acid Components | Isodecanoic/ Benzoic | Isooctanoic/ Benzoic | Isodecanoic |
| Acid to Acid Ratio (molar basis) | 50/50 | 50/50 | 100 |

EXAMPLE 5

*Evaluation of plasticizer performance*

Plasticizer performance was evaluated with a polyvinyl chloride homopolymer having an inherent viscosity of 1.0 and each of the esters of Examples 1–4, in the ratio of 100 parts by weight of polymer per 50 parts by weight of plasticizer. The evaluation tests were as follows:

Durometer "A" Hardness __ ASTM D–676–49T.
Extraction Oil, K _____ Bakelite Plasticizer Manual WC–88C/1.
Water, percent _____ E. F. Schulz, ASTM Bull. No. 83, July 1952.
SPI volatility, percent _____ ASTM 12–3–52T.

*Minimum flux temperature.*—Equal parts by weight of test plasticizers and poly(vinyl chloride) were stirred together in a beaker to form a fluid homogeneous mixture. A narrow (about ¼ inch) strip of this mixture was then poured along a temperature gradient bar whose tempera- It is seen that the plasticizers of the invention (Examples 1–3) have significantly lower minimum fluxing temperatures than the heretofore known plasticizers (Example 4). It is also surprising and unexpected that the plasticized compositions of the invention show lower extraction values for both water and oil than do the heretofore known compositions.

What is claimed is:
1. A plasticized composition which comprises a homogeneous admixture of (a) a vinyl chloride polymer selected from the group consisting of vinyl chloride homopolymer and copolymers of vinyl chloride and an ethylenically unsaturated monomer that is copolymerizable therewith, said vinyl chloride polymer having an inherent viscosity in the range of from 0.2 to 1.6, and (b) a plasticizing amount of a mixed benzoic/alkanoic ester of 2-hydroxymethyl-2-methylpropyl 2-hydroxymethyl-2-methylpropionate, the alkanoic moieties having from 6 to 18 carbon atoms and the benzoic and alkanoic moieties being present in a benzoic:alkanoic molar ratio in the range of from 17:30 to 30:70.
2. The plasticized composition of claim 1 wherein the vinyl chloride polymer is a homopolymer of vinyl chloride.
3. The plasticized composition of claim 1 wherein the alkanoic moieties are derived from octanoic acid.
4. The plasticized composition of claim 1 wherein the alkanoic moieties are derived from nonanoic acid.
5. The plasticized composition of claim 1 wherein the alkanoic moieties are derived from decanoic acid.

References Cited

UNITED STATES PATENTS 3,000,747   9/1961   Martin et al. _____ 260—31.6
3,072,591   1/1963   Fath _____ 260—31.6

MORRIS LIEBMAN, *Primary Examiner.*

A. H. KOECKERT, R. S. BARON, *Assistant Examiners.*

UNITED STATES PATENT OFFICE
CERTIFICATE OF CORRECTION

Patent No. 3,370,032                              February 20, 1968

George H. Potter

It is certified that error appears in the above identified patent and that said Letters Patent are hereby corrected as shown below:

Column 4, line 55, "17:30" should read -- 70:30 --.

Signed and sealed this 30th day of September 1969.

(SEAL)
Attest:

Edward M. Fletcher, Jr.                        WILLIAM E. SCHUYLER, JR.
Attesting Officer                                  Commissioner of Patents